(12) United States Patent
Kundu et al.

(10) Patent No.: US 10,504,164 B2
(45) Date of Patent: Dec. 10, 2019

(54) SELF-SERVICE ACCOUNT ENROLLMENT SYSTEM

(75) Inventors: Mukul Kundu, San Francisco, CA (US); William Blaby, Concord, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 143 days.

(21) Appl. No.: 13/611,202

(22) Filed: Sep. 12, 2012

(65) Prior Publication Data

US 2014/0074490 A1 Mar. 13, 2014

(51) Int. Cl.
G06Q 10/10 (2012.01)
G06Q 10/06 (2012.01)
G06Q 30/02 (2012.01)
G06Q 30/06 (2012.01)
G06Q 30/00 (2012.01)

(52) U.S. Cl.
CPC ...... G06Q 30/0609 (2013.01); G06Q 30/016 (2013.01); G06Q 30/0281 (2013.01)

(58) Field of Classification Search
CPC .......... G06Q 30/016; G06Q 30/0281; G06Q 30/0609
USPC ............ 713/182; 705/41, 304, 346, 1.1–912
See application file for complete search history.

(56) References Cited

U.S. PATENT DOCUMENTS

| | | | | |
|---|---|---|---|---|
| 6,981,043 B2* | 12/2005 | Botz | ............ | G06F 21/41 707/999.104 |
| 7,058,817 B1 | 6/2006 | Ellmore | | |
| 7,475,151 B2* | 1/2009 | Delany et al. | ............ | 709/229 |
| 7,742,930 B1* | 6/2010 | Calhoun et al. | ............ | 705/2 |
| 7,831,468 B1 | 11/2010 | Conte et al. | | |
| 7,975,287 B2* | 7/2011 | Hung | ............ | G06F 21/335 709/225 |
| 8,266,031 B2 | 9/2012 | Norris et al. | | |
| 8,327,428 B2* | 12/2012 | Bailey | ............ | G06F 21/41 726/8 |
| 8,683,550 B2* | 3/2014 | Hung | ............ | G06F 21/335 709/217 |
| 9,749,331 B1* | 8/2017 | Koeten | ............ | H04L 67/10 |
| 2002/0069178 A1* | 6/2002 | Hoffman | ............ | 705/64 |
| 2002/0083008 A1* | 6/2002 | Smith et al. | ............ | 705/64 |
| 2003/0120593 A1* | 6/2003 | Bansal et al. | ............ | 705/39 |
| 2003/0125062 A1* | 7/2003 | Bethards et al. | ............ | 455/517 |
| 2003/0195970 A1* | 10/2003 | Dinh | ............ | H04L 63/0815 709/229 |
| 2003/0229522 A1 | 12/2003 | Thompson et al. | | |
| 2007/0168228 A1* | 7/2007 | Lawless | ............ | 705/2 |
| 2008/0059804 A1* | 3/2008 | Shah | ............ | G06F 21/41 713/186 |

(Continued)

OTHER PUBLICATIONS

Oracle® Fusion Middleware: "Developer's Guide for Oracle Identity Manager" (hereinafter Oracle).*

*Primary Examiner* — Jonathan P Ouellette
(74) *Attorney, Agent, or Firm* — Potomac Law Group, PLLC

(57) ABSTRACT

A self-service account enrollment system is provided that enrolls a self-service user. The self-service account enrollment system links a user identity of the self-service user to an account identity of a self-service account within a web portal system. The self-service user gains access to the self-service account within the web portal system based on the link between the account identity and the user identity.

20 Claims, 7 Drawing Sheets

(56) References Cited

U.S. PATENT DOCUMENTS

| | | | |
|---|---|---|---|
| 2008/0103800 A1* | 5/2008 | Domenikos et al. | 705/1 |
| 2010/0136943 A1* | 6/2010 | Hirvela et al. | 455/404.1 |
| 2011/0026704 A1* | 2/2011 | Connelly | H04L 63/102 379/219 |
| 2012/0011578 A1* | 1/2012 | Hinton | H04L 9/3228 726/8 |
| 2012/0054095 A1 | 3/2012 | Lesandro et al. | |
| 2012/0210413 A1* | 8/2012 | Akula | H04L 63/0815 726/8 |
| 2012/0291114 A1* | 11/2012 | Poliashenko | G06F 21/41 726/8 |
| 2013/0086669 A1* | 4/2013 | Sondhi | G06F 21/41 726/8 |
| 2013/0312076 A1* | 11/2013 | Houthooft | H04L 63/0815 726/8 |
| 2014/0068732 A1* | 3/2014 | Hinton | G06F 21/41 726/6 |

* cited by examiner

Fig. 6

SELF-SERVICE ACCOUNT ENROLLMENT SYSTEM

FIELD

One embodiment is directed to a computer system, and more particularly, to a computer system that manages account data.

BACKGROUND

Self-service is the practice of serving oneself, and can be utilized over the Internet to facilitate automated customer service interactions. Self-service users generally desire to access their account data through a medium, such as the Internet. For example, a customer of a utility company generally desires the ability to manage their utility accounts, monitor consumption of utilities, manage billing information, and interact with the utility company. Thus, the utility company can provide a web portal system that allows the customer to access such account information over the Internet.

It is desirable that only the self-service user (or perhaps a proxy) be able to access the account data. Thus, a way for self-service users to validate themselves when accessing their account data through the Internet is generally required to prevent unauthorized access to account information. A user can create a login and password and potentially link that login with a single account in an account management system. However, it can be difficult to scale that process for multiple accounts in an automated fashion.

SUMMARY

One embodiment is directed to a self-service account enrollment system that enrolls a self-service user. The self-service account enrollment system creates a self-service account for the self-service user at a web portal system, where the self-service account includes an account identity. The self-service account enrollment system further sends a request for validation to an account management system. The self-service account enrollment system further receives validation request information from the account management system, where the validation request information is stored within the account management system. The self-service account enrollment system further sends validation response information to the account management system. The self-service account enrollment system further receives validation confirmation information from the account management system, where the validation confirmation information includes the account identity. The self-service account enrollment system further links a user identity of the self-service user to the account identity within the web portal system, where the self-service user gains access to the self-service account within the web portal system based on the link between the account identity and the user identity.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 6 illustrates an example user interface for enrolling to a self-service account, according to an embodiment of the invention.

DETAILED DESCRIPTION

Figure 1:
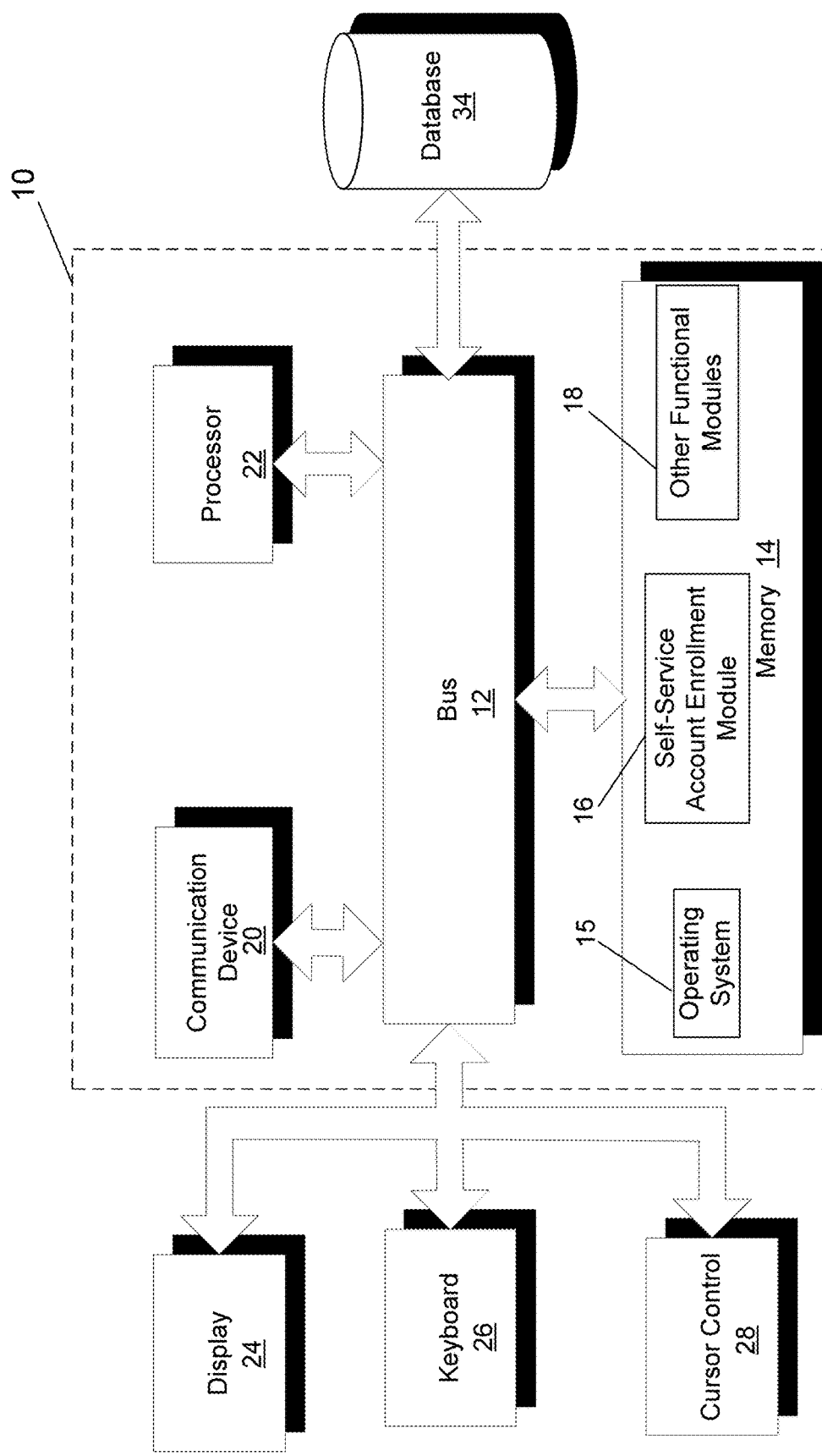
FIG. 1 illustrates a block diagram of a self-service account enrollment system that can implement an embodiment of the invention.

In one embodiment, a self-service account enrollment system is provided. The self-service account enrollment system is an automated validation system that allows self-service users to validate their user identities with one or more self-service accounts through an "enrollment" process. The enrollment process can decouple security of a web portal system from an account management system, where the web portal system handles the authentication of a self-service user, and the self-service account enrollment system handles the authorization of the self-service user. The self-service account enrollment system can allow a self-service user to "enroll" into a self-service account, provided that the self-service user can answer specific validation questions in an automated fashion. The validation questions can be fully configurable through the account management system. Thus, the authorization of the self-service user can be incorporated as part of the authentication process. Moreover, the self-service user can invite and disinvite other users to access the self-service account.

In order to validate self-service users, prior self-service systems would require that a self-service user interact with the service provider in some way. For example, a self-service user that is a customer of a utility company could visit an office maintained by the utility company, show identifying documents (such as a driver's license or passport), and the utility company could then establish the self-service account for the self-service user within the self-service system. However, this approach has scalability problems where a service provider can potentially have thousands or hundreds of thousands of customers.

Another approach utilized by prior self-service systems was for the service provider to email a temporary password to an email address on file that was associated with a self-service account. The self-service user could access the temporary password using his or her email, and use the temporary password to activate the self-service account, and create a permanent password. The self-service user could then access the self-service system using the permanent password. This process would generally require the service provider to take the initiative and reach out to its customers, including customers who may not ever use the self-service system. Alternatively, a service provider could wait until a customer requests online access to the self-service system, and then email the customer the temporary password to the email address on file. However, the service provider would be burdened with putting the customer on notice that such a self-service system exists.

Furthermore, the temporary password approach also suffers from a number of problems. First, the temporary password approach only provides one-to-one access (i.e., one account for one user), and does not provide one-to-many access (i.e., one account for many users). In many situations (such as commercial or industrial situations), there can be many different users (including self-service users and third-party users) who require access to the account information. The temporary password approach would require third-party accounts to be manually created, and a temporary password to be emailed to every third-party. Thus, this would require every single user email address and password to be directly tied to an account, even if the email address and password belonged to the third-party, rather than the self-service user. Further, if a self-service user's email account was compromised, anyone could access the self-service user's account information, potentially including confidential information that the self-service user would rather maintain in confidence, such as credit card information. Additionally, there may be a delayed process between a self-service user requesting access and being able to use the self-service system. Finally, the temporary password approach could require an account management system to handle security of the web portal system as well, to prevent unauthorized access to a self-service user's account information. As described below, a self-service account enrollment system, according to certain embodiments of the invention, can avoid these problems, and can provide for robust multiple-user access of self-service accounts.

FIG. 1 illustrates a block diagram of a self-service account enrollment system 10 that can implement one embodiment of the invention. Self-service account enrollment system 10 includes a bus 12 or other communications mechanism for communicating information between components of self-service account enrollment system 10. Self-service account enrollment system 10 also includes a processor 22, operatively coupled to bus 12, for processing information and executing instructions or operations. Processor 22 may be any type of general or specific purpose processor. Self-service account enrollment system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Self-service account enrollment system 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with self-service account enrollment system 10.

According to one embodiment, memory 14 can store software modules that may provide functionality when executed by processor 22. The modules can include an operating system 15, a self-service account enrollment module 16, as well as other functional modules 18. Operating system 15 can provide an operating system functionality for self-service account enrollment system 10. Self-service account enrollment module 16 can provide functionality for enrolling a self-service user, as will be described in more detail below. In certain embodiments, self-service account enrollment module 16 can comprise a plurality of modules, where each module provides specific individual functionality for enrolling a self-service user. Self-service account enrollment system 10 can also be part of a larger system. Thus, self-service account enrollment system 10 can include one or more additional functional modules 18 to include the additional functionality. For example, functional modules 18 may include modules that provide additional functionality, such as the "Oracle Utilities Customer Self Service WebCenter" product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
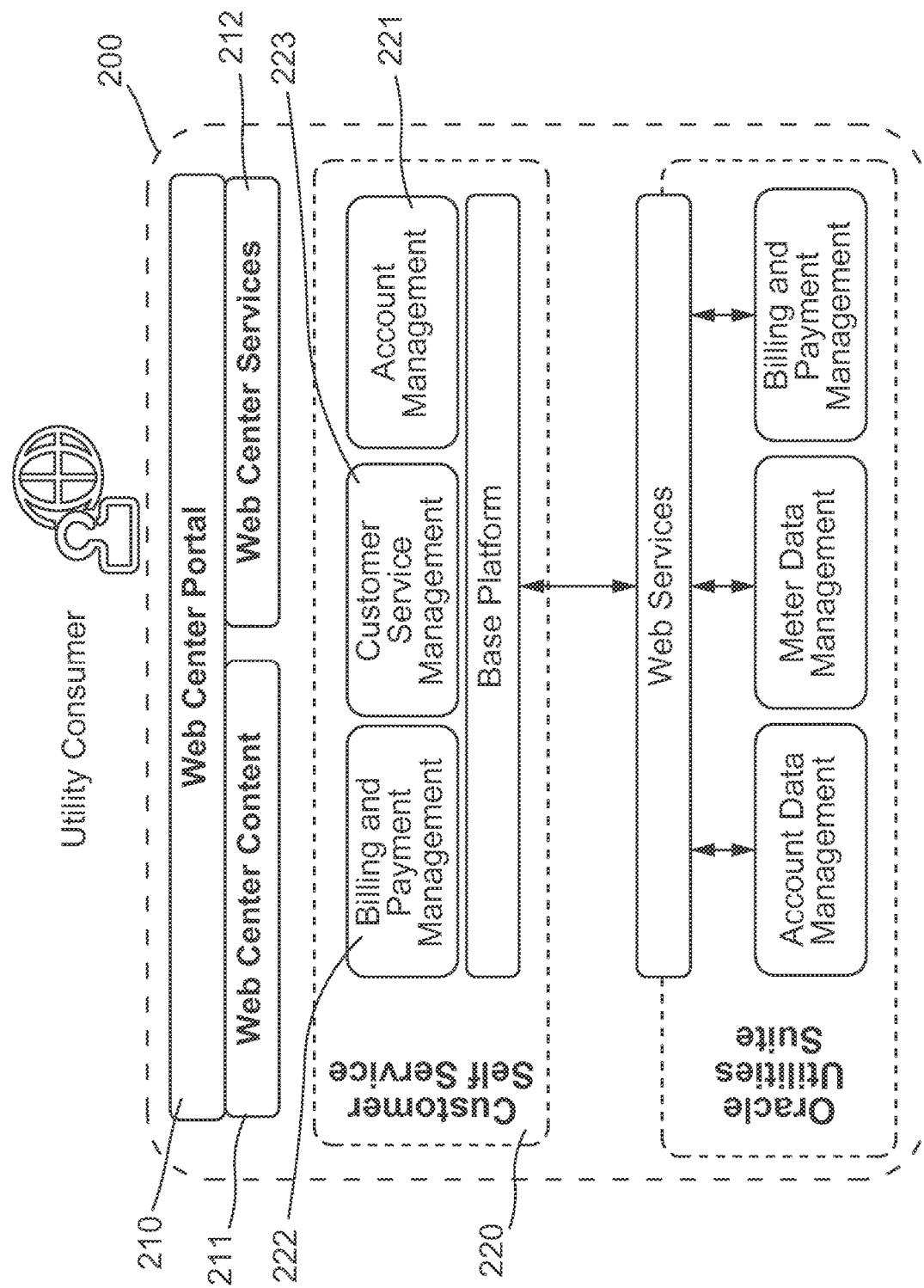
FIG. 2 illustrates a block diagram of an architecture of a self-service account enrollment system, according to an embodiment of the invention.

FIG. 2 illustrates a block diagram of an architecture of a self-service account enrollment system 200, according to an embodiment of the invention. The self-service account enrollment system 200 includes a web portal system 210 and an account management system 220, according to the embodiment. Web portal system 210 includes one or more modules that that can provide specific functionality when executed by a processor (such as processor 22 of FIG. 1). More specifically, web portal system 210 displays information from a plurality of sources in a unified manner. From a perspective of an end-user, web portal system 210 is a web site with one or more pages that are organized by tabs or some other form of navigation. Each page can contain portlets, pagelets, static content, dynamic content, task flows, or other elements. A portlet is a reusable web component that can draw content from a plurality of sources. A pagelet is a reusable user interface component that is similar to a portlet, but that can be run on any web page, including within a portal or other web application. Static content is web page content that is delivered to a user exactly as stored (such as Hypertext Markup Language ("HTML") content). Dynamic content is web page content that is generated at a time that an end-user accesses web portal system 210 (such as JavaScript, ActionScript, Dynamic HTML, or Flash content). A task flow is a customizable application that includes one or more reusable units of business logic. Web portal system 210 can display information that is stored within account management system 220 to an end-user. In one embodiment, as illustrated in FIG. 2, web portal system 210 can include a universal content management module 211 and a web center services module 212 that can provide the aforementioned functionality. Additionally, in one embodiment, web portal system 210 can include a self-service account enrollment module (such as self-service account enrollment module 16 of FIG. 1).

Account management system 220 includes one or more modules that can provide specific functionality when executed by a processor (such as processor 22 of FIG. 1). More specifically, account management system 220 manages information regarding one or more self-service accounts. For example, account management system 220 manages information regarding one or more utility accounts. Such management of account information can include: providing robust account and security management across one or more self-service modules; allowing end-users to manage registration, passwords, alerts, or notifications; providing tools for end-users to manage financial transactions associated with their self-service account, such as viewing bills, payment histories, service charges, promotions, rate plans or products, managing electronic billing, or requesting payment arrangements; allowing end-users to interact with a service provider, such as requesting start, stop, or transfer of service, inputting scalar meta data, viewing detailed service usage and costs, and reporting outages, outage maps, or service restoration times; viewing metadata used by account management system 220; or viewing and managing access roles and security roles. In one embodiment, as illustrated in FIG. 2, account management system 220 can include an account management module 221, a billing and payment management module 222, and a customer service management module 223 that can provide the aforementioned functionality. Further, according to the embodiment, web portal system 210 and account management system 220 communicate with each other using one or more web services.

Figure 3:
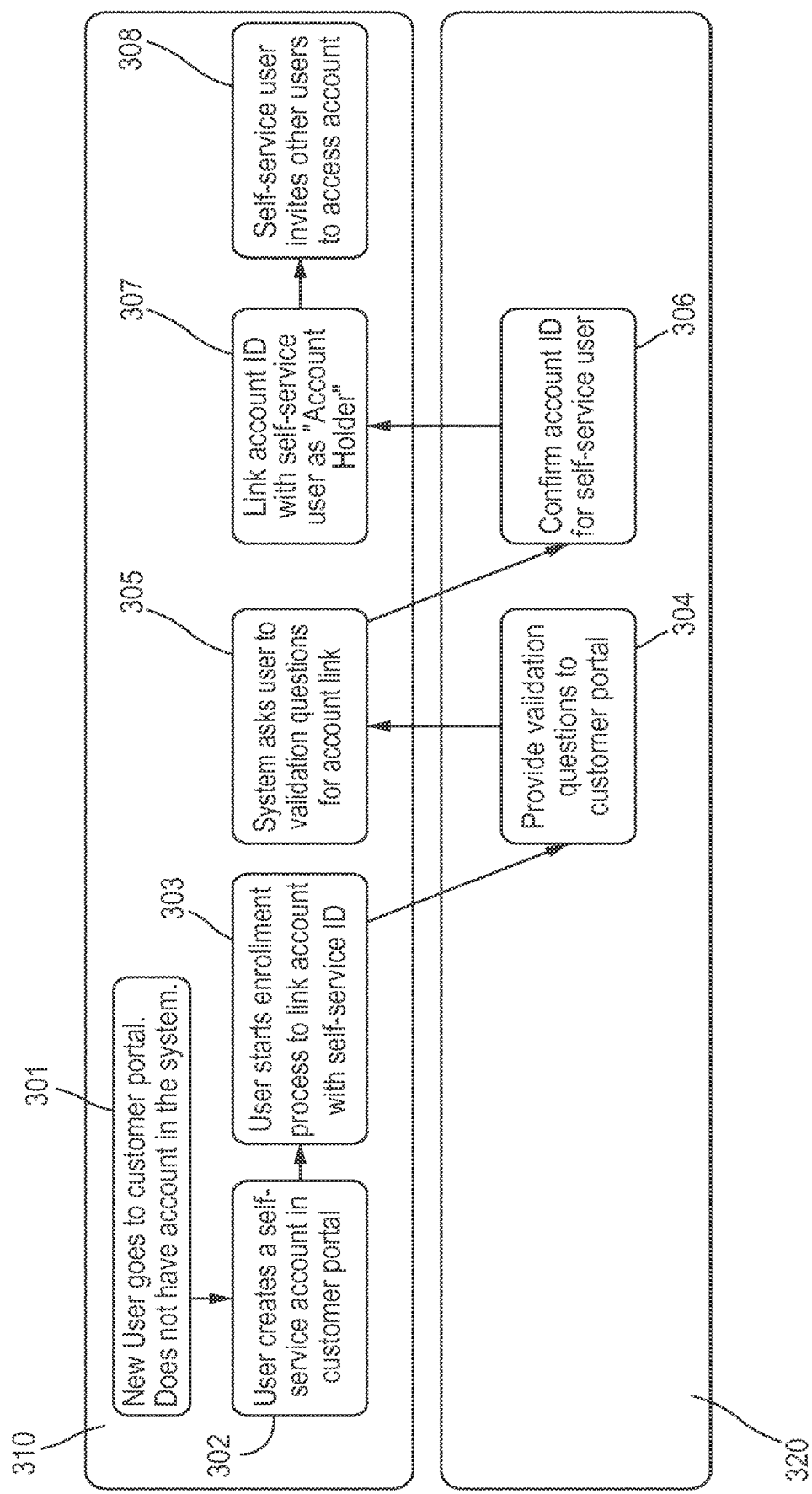
FIG. 3 illustrates a flow diagram of an enrollment process, according to an embodiment of the invention.

FIG. 3 illustrates a flow diagram of an enrollment process, according to an embodiment of the invention. In one embodiment, the functionality of the flow diagram of FIG. 3, as well as the functionality of the flow diagram of FIG. 7, described below, are each implemented by software stored in a memory or some other computer-readable or tangible medium, and executed by a processor. In other embodiments, the functionality may each be performed by hardware (e.g., through the use of an application specific integrated circuit ("ASIC"), a programmable gate array ("PGA"), a field programmable gate array ("FPGA"), etc.), or any combination of hardware and software. In one embodiment, the functionality of the flow diagrams of FIGS. 3 and 7 can be implemented by a self-service account enrollment module (such as self-service account enrollment module 16 of FIG. 1).

FIG. 3 further illustrates components of a self-service account enrollment system, a web portal system 310 and an account management system 320. In one embodiment, web portal system 310 is similar to web portal system 210 of FIG. 2, and account management system 320 is similar to account management system 220 of FIG. 2. According to the illustrated embodiment, functionality of the flow diagram of FIG. 3 that is illustrated within web portal system 310 is implemented at web portal system 310, and functionality of the flow diagram of FIG. 3 that is illustrated within account management system 320 is implemented at account management system 320. Further, according to the embodiment, web portal system 310 and account management system 320 communicate with each other using one or more web services. As will be described below, the enrollment process can provide robust management for multiple self-service accounts within the self-service account enrollment system.

The flow begins, and at 301, a self-service user accesses web portal system 310. For example, the self-service user can execute web portal system 310 on a device, such as a computer or mobile device. As another example, the self-service user can navigate to a page that is a component of web portal system 310 utilizing a web browser. In the illustrated embodiment, the self-service user does not have a self-service account within account management system 320. According to the embodiment, a self-service user does not have access to the self-service account until the self-service user validates himself or herself through the enrollment process illustrated in FIG. 3. The flow then proceeds to 302.

At 302, the self-service user creates a self-service account within account management system 320 using web portal system 310. According to an embodiment, the self-service user can create the self-service account by "clicking on" or touching an element (such as a button) that is displayed within a user interface displayed by web portal system 310. In response to the self-service user "clicking on" or touching the element, web portal system 310 can send an instruction to account management system 320 to create a self-service account, using one or more web services. The creation of the self-service account can include the creation of an account identity, where the account identity identifies the self-service account. As part of the instruction to create the self-service account, the web portal system 310 can also send information about the self-service user to account management system 320. Such information can be gathered by web portal system 310 when a self-service user creates a login (also identified as a "self-service user identity," "self-service user ID," "user identity, or "user ID") for web portal system 310. In certain embodiments, a user identity can be an email address associated with the self-service user. Information about the self-service user can be gathered by web portal system 310 in a number of different ways. For example, when a self-service user creates a user identity for web portal system 310, web portal system 310 can display one or more fields to the self-service user, and the self-service user can enter information about the self-service user within the one or more fields. Web portal 310 can then store the information and associate the information with the self-service user's user identity. Such information can include: a name of the self-service user, a residence address of the self-service user, a billing address of the self-service user, or one or more roles associated with the self-service user. The flow then proceeds to 303.

At 303, the self-service user starts an enrollment process to link the self-service account created at 302 to the self-service user's user identity. According to an embodiment, the self-service user can start the enrollment process by "clicking on" or touching an element (such as a button) that is displayed within a user interface displayed by web portal system 310. In response to the self-service user "clicking on" or touching the element, web portal system 310 can send an instruction to account management system 320 to start the enrollment process. The instruction to start the enrollment process can include a request for validation of the self-service user. The flow then proceeds to 304.

At 304, account management system 320 provides one or more validation questions to web portal system 310. The one or more validation questions are an example of validation request information that can be stored within account management system 320. The one or more validation questions can be questions that ask for specific information known only to the self-service user. For example, the one or more validation questions can ask for the self-service user's name (including first name, last name, or a combination of the two), the self-service user's address, the self-service user's phone number, or the self-service user's social security number. As previously described, the one or more validation questions can be stored within account management system 320. Further, the one or more validation questions can also be configured by account management system 320. For example, the one or more validation questions can be configured based on an account type of the self-service account that the self-service user is requesting to be enrolled in. Thus, the one or more validation questions can be different based on the account type of the self-service account. The flow then proceeds to 305.

At 305, web portal system 310 asks the self-service user the one or more validation questions. In certain embodiments, web portal system 310 displays the one or more validation questions to the self-service user within the user interface. In these embodiments, web portal system 310 can also display one or more fields, where the fields allow the self-service user to enter one or more validation answers. The one or more validation answers are an example of validation response information that can be sent to account management system 320. A self-service user can enter a validation answer within a field by "clicking on" or touching the field, and then typing in the validation answer. Once the self-service user has finished entering the one or more validation answers, the self-service user can confirm completion of the one or more validation answers. For example, a self-service user can "click on" or touch an element (such as a button) that is displayed within the user interface. The "clicking on" or touching of the element can serve as an indication that the self-service user has finished entering the one or more validation answers. Web portal system 310 can then send the one or more validation answers to account management system 320. The flow then proceeds to 306.

At 306, account management system 320 confirms an account identity for the self-service user. More specifically, account management system 320 can receive the one or more validation answers and evaluate the one or more validation answers. Such an evaluation can include comparing the one or more validation answers with one or more validation answers that are stored within account management system 320. If account management system 320 evaluates that the one or more validation answers are correct answers, account management system 320 can select an account identity that corresponds to the self-service account and send the account identity to web portal system 310. The account identity is an example of validation confirmation information that can be sent to web portal system 310. The sending of the account identity to web portal system 310 can serve as an indication that the self-service user is permitted to access the self-service account. The flow then proceeds to 307.

At 307, web portal system 310 links the account identity received from account management system 320 to the user identity of the self-service user. By linking the account identity with the user identity, web portal system 310 creates an association (also identified as a "link") between the account identity and the user identity, where the link indicates that the self-service user associated with the user identity can access the self-service account associated with the account identity. This link is subsequently stored within web portal system 310. Thus, the self-service user gains access to the self-service account based on this link, and can access the self-service account from web portal system 310. In certain embodiments, the link can identify the self-service user as an "account holder," and thus can provide the self-service user with full access to the self-service account. This can mean that the self-service user can access any account information associated with the self-service account that is stored within account management system 320. Further, when the self-service user subsequently logs into web portal system 310, web portal system 310 can retrieve the link between the account identity and the user identity that is stored within web portal system 310, and can automatically grant the self-service user access to the self-service account. Thus, in subsequent sessions, the enrollment process is not required to be implemented for the self-service user in order to grant the self-service user access to the self-service account. The flow then proceeds to 308.

At 308, the self-service user invites other users to access the self-service account. According to the embodiment, once a self-service user has access to a self-service account, the self-service user can grant access to the self-service account to the one or more users. The self-service user can grant access to the one or more users by linking each user identity of the one or more users to both the user identity of the self-service user and the account identity within web portal system 310. In one embodiment, the self-service user can grant access to the self-service account to the one or more users by "clicking on" or touching an element (such as a button) that is displayed within a user interface displayed by web portal system 310. Subsequently, the self-service user can enter information regarding the one or more users within web portal system 310. For example, web portal system 310 can display one or more fields, and the self-service user can enter information regarding the one or more users within the one or more fields. As another example, web portal system 310 can display a list of one or more users, and the self-service user can select one or more users from the list.

Further, the self-service user can grant limited access to the self-service account to at least one of the one or more users. Limited access can mean that the user can only access specific account information associated with the self-service account that is stored within account management system 320, and that the user cannot access the remaining information associated with the self-service account that is stored within account management system 320. For example, a user who is granted limited access to the self-service account may only be able to access information associated with utility usage, but cannot access information associated with billing. According to the embodiment, a user who is granted access to the self-service account (whether it is full access or limited access) can access the self-service account using web portal system 310 without having to enroll with account management system 320 using the enrollment process. Thus, roles and access configurations for a user can be configurable during implementation of the enrollment process. According to the embodiment, in addition to the self-service account that the self-service user has created, the self-service user can grant access to any self-service account that the self-service user has access to. In certain embodiments, the self-service user can also remove access to the self-service account from one or more users. The self-service user can remove access from the one or more users by unlinking each user identity of the one or more users from both the user identity of the self-service user and the account identity within web portal system 310. After a self-service user grants access to the self-service account to one or more users, the flow then ends.

Figure 4:
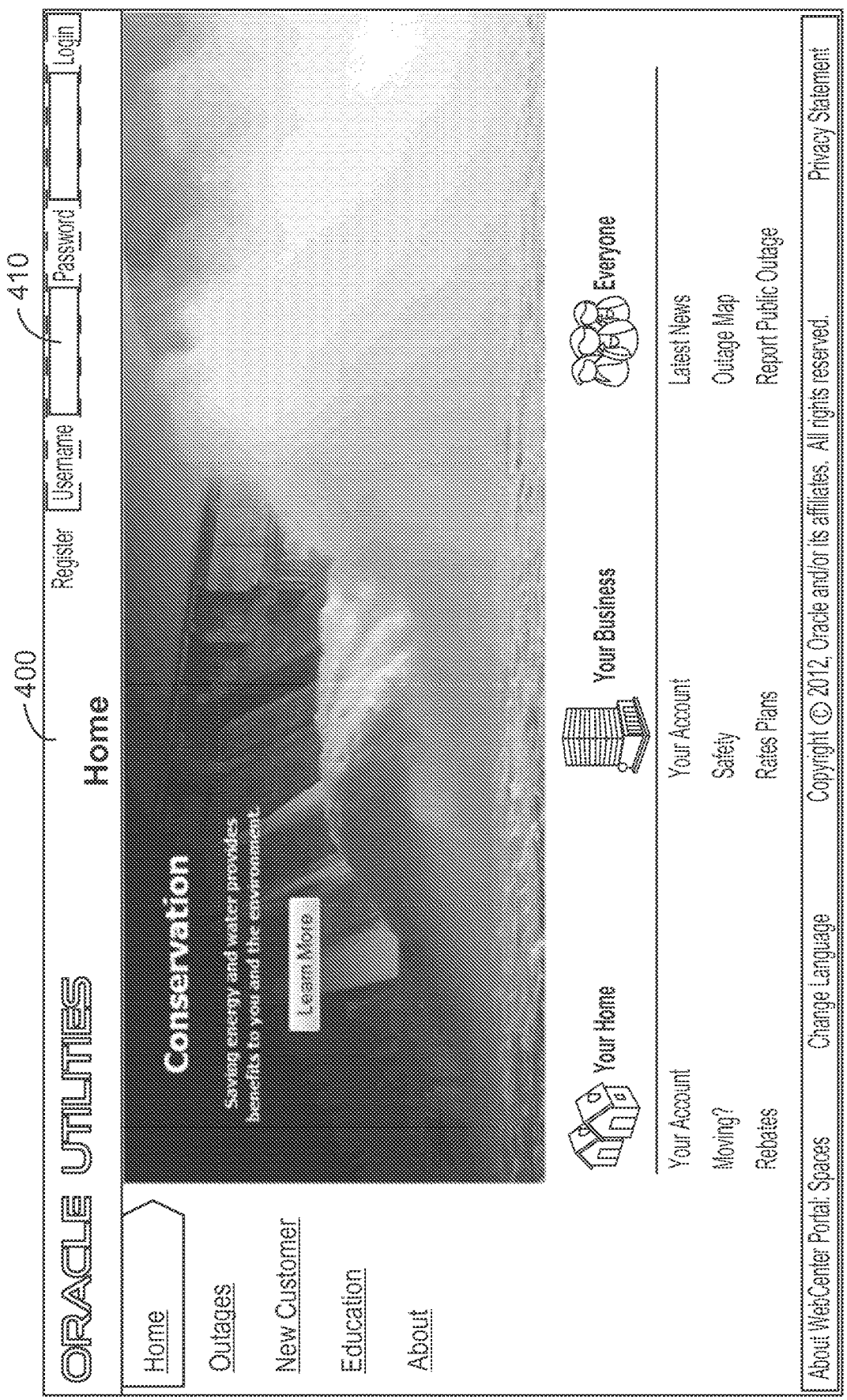
FIG. 4 illustrates an example user interface, according to an embodiment of the invention.

FIG. 4 illustrates an example user interface 400, according to an embodiment of the invention. In certain embodiments, user interface 400 is a user interface of a web portal system (such as web portal system 210 of FIG. 2 and web portal system 310 of FIG. 3). User interface 400 displays a portal that includes information from a plurality of sources. In certain embodiments, one of the sources includes an account management system (such as account management system 220 of FIG. 2 and account management system 320 of FIG. 3). User interface 400 can display login component 410, which can include a username field, a password field, and a login button. A self-service user can log into the web portal system by entering a user identity within the username field, entering a corresponding password within the password field, and "clicking on" or touching the login button. Once a self-service user logs into the web portal system, the self-service user can cause a list of self-service accounts to be displayed within user interface 400. The self-service user can further manage one or more self-service accounts, as is described below in relation to FIG. 5.

Figure 5:
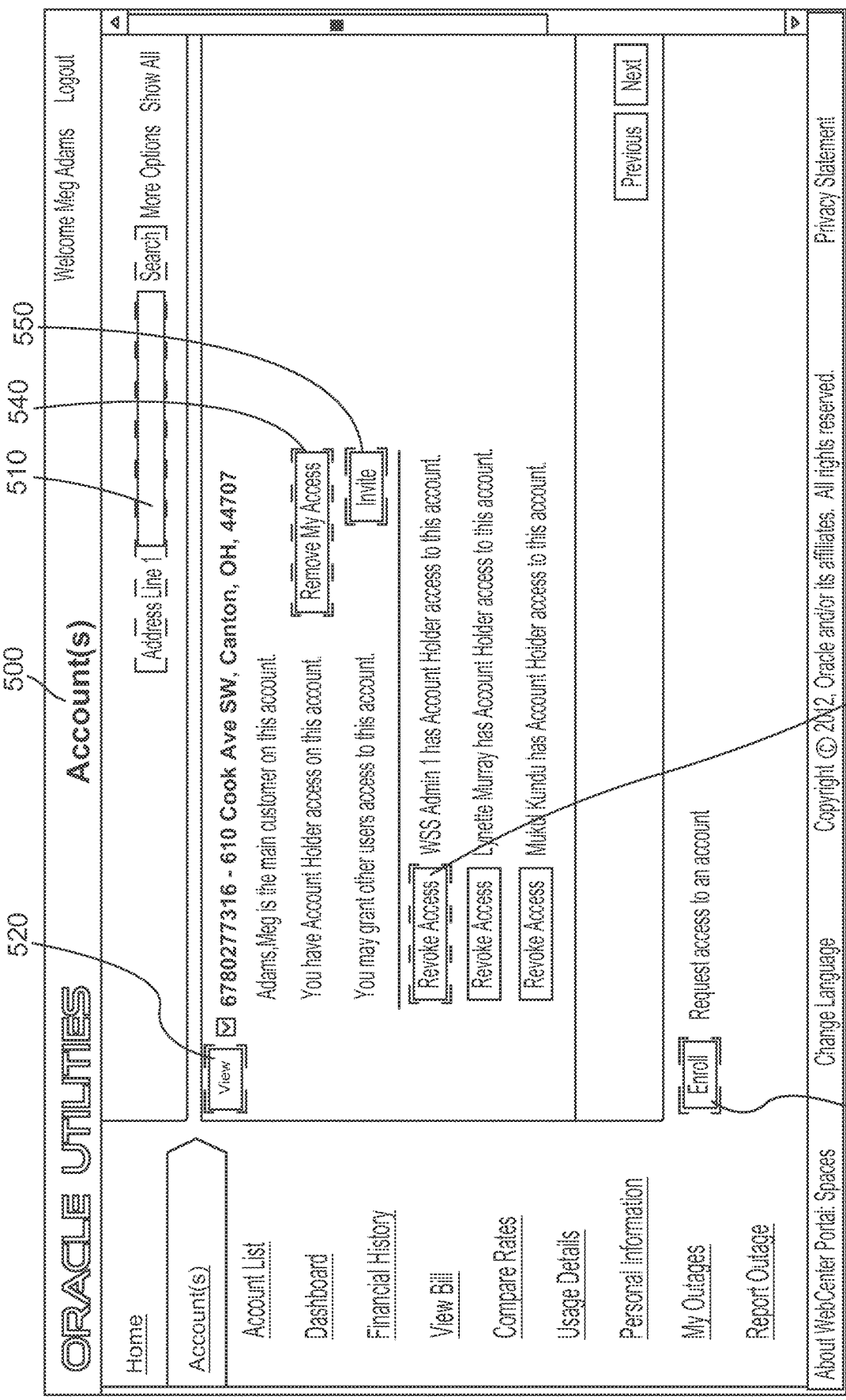
FIG. 5 illustrates an example user interface for managing self-service accounts, according to an embodiment of the invention.

FIG. 5 illustrates an example user interface 500 for managing self-service accounts, according to an embodiment of the invention. In certain embodiments, user interface 500 is a user interface of a web portal system (such as web portal system 210 of FIG. 2 and web portal system 310 of FIG. 3). In the illustrated embodiment of FIG. 5, user interface 500 displays account information related to a self-service account with the account identity "6780277316." User interface 500 also displays search component 510, which can include an address field and a search button. A self-service user can search a list of self-service accounts by entering an address within the address field and "clicking on" or touching the search button. User interface 500 also displays view button 520. By "clicking on" or touching view button 520, the self-service user can cause the account information associated with the self-service account to be displayed within user interface 500. User interface 500 also displays enroll button 530. By "clicking on" or touching enroll button 530, the self-service user can request access to the self-service account displayed within user interface 500, and can initiate the enrollment process previously described in relation to FIG. 3. User interface 500 also displays remove access button 540. By "clicking on" or touching remove access button 540, the self-service user can relinquish its access to the self-service account displayed within user interface 500. User interface also displays invite button 550. By "clicking on" or touching invite button 550, the self-service user can grant access to the self-service account to one or more users. User interface 500 also displays revoke access button 560. By "clicking on" or touching revoke access button 560, the self-service user can remove access to the self-service account from one or more users.

Figure 6:
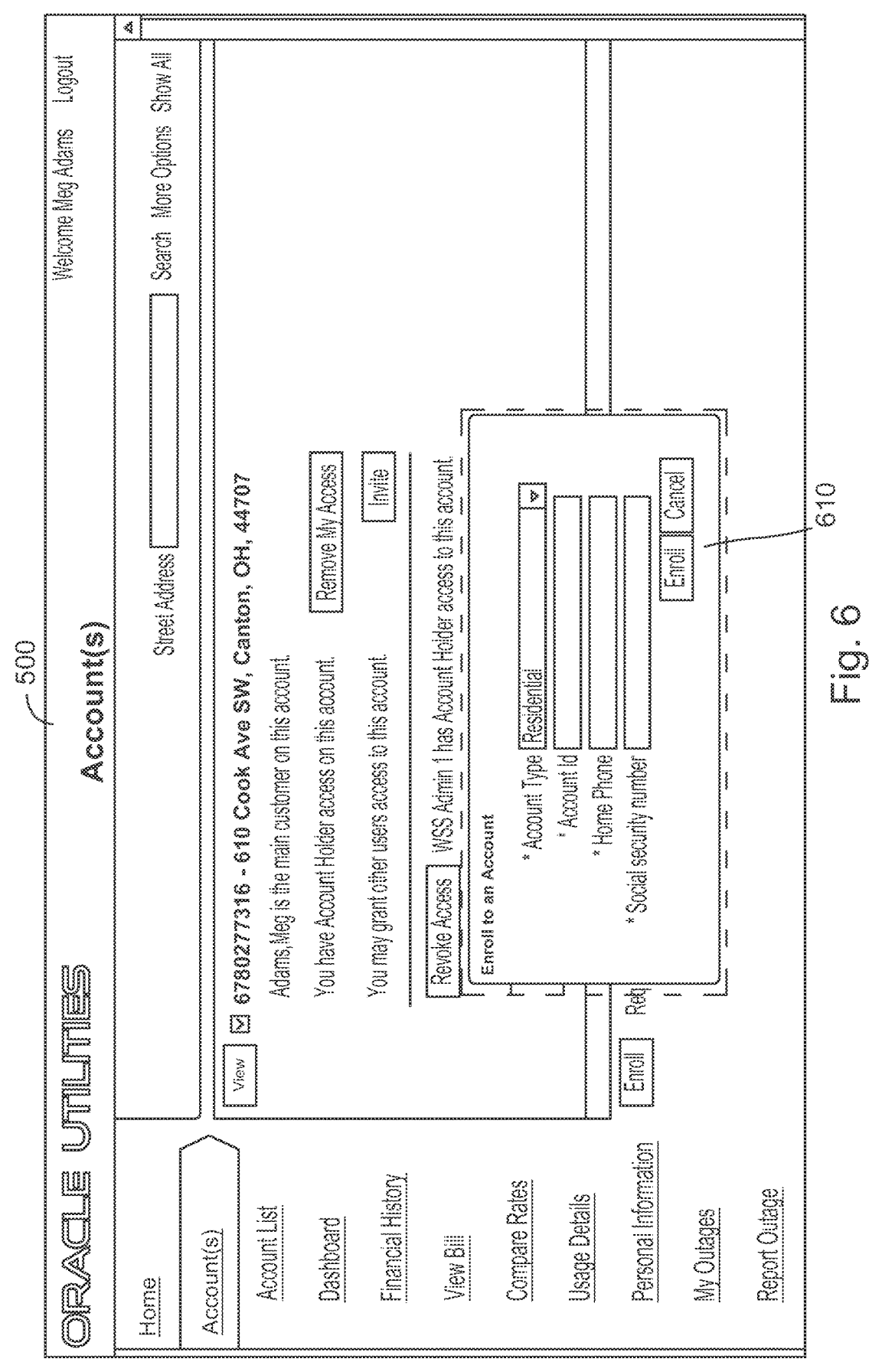

FIG. 6 illustrates an example user interface 610 for enrolling to a self-service account, according to an embodiment of the invention. User interface 610 can be displayed by a web portal system a web portal system (such as web portal system 210 of FIG. 2 and web portal system 310 of FIG. 3). According to the illustrated embodiment, user interface 610 can be displayed as a result of a self-service user "clicking on" or touching enroll button 530 of FIG. 5, and user interface 610 can be displayed so that it is superimposed over user interface 500. User interface 610 can display one or more validation questions that are sent to the web portal system by an account management system (such as account management system 220 of FIG. 2 and account management system 320 of FIG. 3). Further, the one or more validation questions can be configured by the account management system based on an account type of the self-service account that the self-service user is enrolling to. In the illustrated embodiment, user interface 610 displays an account type field, where the value of the account type field is set to "Residential." Based on the value of the account type field, user interface 610 displays three additional fields: an account identity field, a home phone field, and a social security number field. In this embodiment, the account identity field, the home phone field, and the social security number field represent the validation questions. The self-service user can provide validation answers in response to the validation questions, by entering a value within the account identity field, the home phone field, and the social security number fields. By "clicking on" or touching an enroll button displayed within user interface 610, the self-service user can cause the web portal system to send the validation answers to the account management system. The account management system can then validate the validation answers and grant the self-service user access to the requested self-service account, as previously described.

Figure 7:
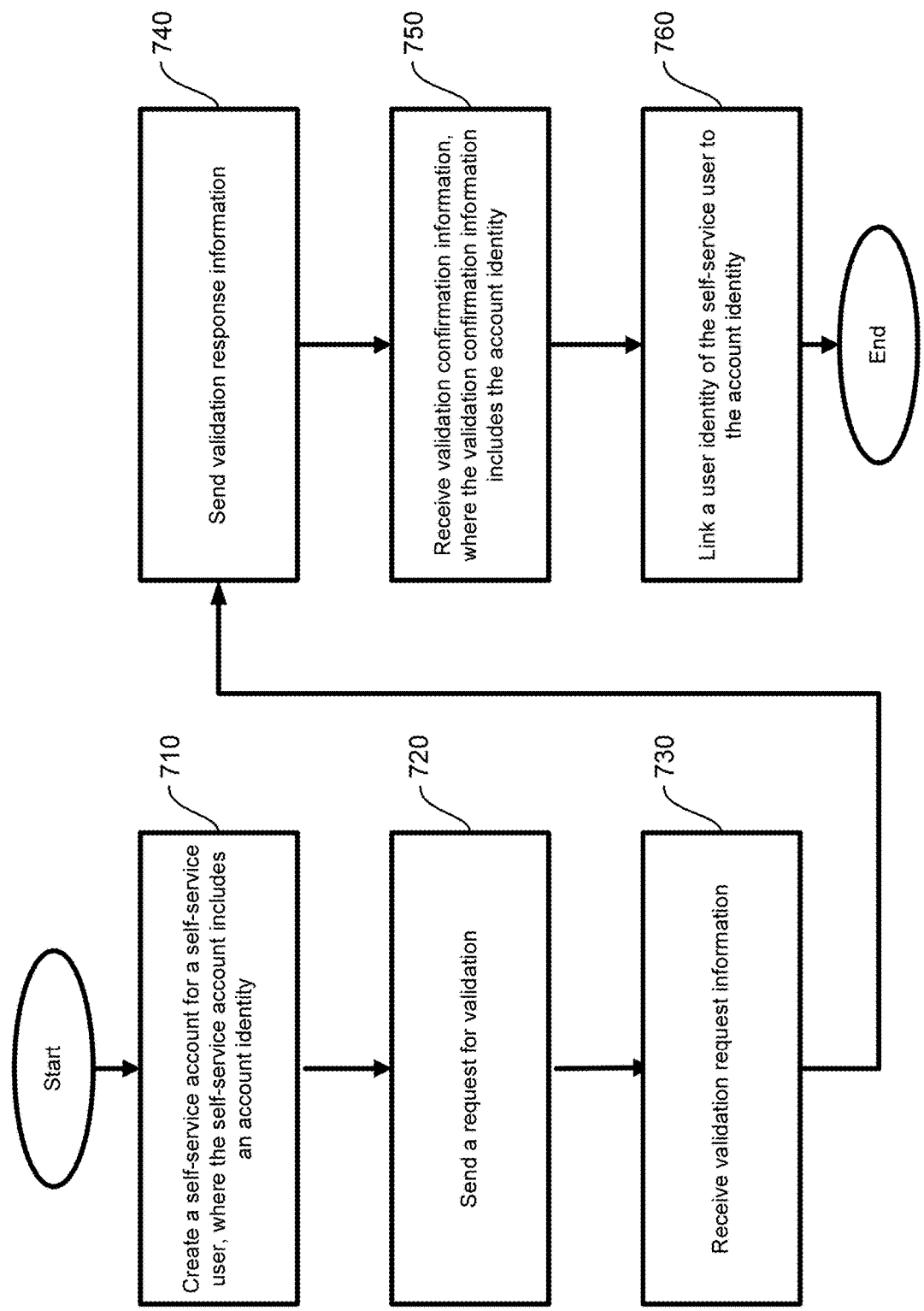
FIG. 7 illustrates a flow diagram of the functionality of a self-service account enrollment module, according to an embodiment of the invention.

FIG. 7 illustrates a flow diagram of the functionality of a self-service account enrollment module (such as self-service account enrollment module 16 of FIG. 1), according to an embodiment of the invention. The flow begins and proceeds to 710. At 710, a self-service account is created for a self-service user. The self-service account can be created at web portal system. The self-service account can include an account identity. The self-service account can also include an account type. The self-service account can be a utility account. The flow then proceeds to 720.

At 720, a request for validation is sent. The request for validation can be sent to an account management system. The request for validation can be sent over a web service. The flow then proceeds to 730.

At 730, validation request information is received. The validation request information can be received from the account management system. The validation request information can be received over a web service. The validation request information can be stored within the account management system. The validation request information can include one or more validation questions for the self-service user. In certain embodiments, the validation request information can be displayed at a user interface of the web portal system. In embodiments where the self-service account includes an account type, the validation request information can be configured based on the account type. The flow then proceeds to 740.

At 740, validation response information is sent. The validation response information can be sent to the account management system. The validation response information can be sent over a web service. The validation response information can include one or more validation answers provided by the self-service user. In certain embodiments, the validation response information can be received from the self-service user via the user interface. The flow then proceeds to 750.

At 750, validation confirmation information is received. The validation confirmation information can be received from the account management system. The validation confirmation information can include the account identity. The validation confirmation information can be received over a web service. The flow then proceeds to 760.

At 760, a user identity of the self-service user is linked to the account identity. The user identity can be linked to the account identity within the web portal system. The self-service user can gain access to the self-service account within the web portal system based on the link between the account identity and the user identity. In certain embodiments, access to the self-service account can be granted to one or more other users by linking each user identity of the one or more users to both the user identity of the self-service user and the account identity within the web portal system. In these embodiments, the access to the self-service account can be limited for at least one other user of the one or more other users. In certain embodiments, access to the self-service account can be removed from the one or more other users by unlinking each user identity of the one or more users from both the user identity of the self-service user and the account identity within the web portal system. The flow then ends.

Thus, according to an embodiment of the invention, a self-service account enrollment system can be provided that includes a web portal system that is de-coupled from an account management system, where the self-service account enrollment system allows a self-service user to log in to the web portal system and access self-service account information that is stored within the account management system. The de-coupling of the web portal system from the account management system makes it significantly easier to install and maintain the web portal system. Further, based on the de-coupling, the web portal system can work with any type of account management system. Further, the self-service account enrollment system allows a self-service user to grant access to a self-service account to one or more users. Thus, multiple users can log into the web portal system using their own user identity, yet still be able to access the account information associated with the self-service account that is stored within the account management system. Additionally, through an enrollment process where the self-service user is validated, the self-service user can grant access to the one or more users, and the one or more users are not required to go through the same enrollment process. This makes the invitation of guest users significantly easier to implement. The multi-user features that can be provided by the self-service account enrollment system can be very beneficial in a self-service environment, where a service provider can have many commercial customers that generally require significant third-party access to self-service accounts for auditing and other purposes. Finally, the enrollment process is significantly streamlined compared to the existing request-temporary password-validation process used by previous systems.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause one or more processors to provide a self-service account enrollment to a self-service user, the providing comprising:

provide a web portal system accessible to the self-service user that displays, on a remote device associated with the self-service user, web page information from a plurality of sources in a unified manner, wherein the web portal system provides access to a plurality of self-service accounts;

providing an account management system that is communication with the web portal system via one or more web services and is at least one of the plurality of sources displayed on the web portal system, wherein the account management system manages account information regarding the self-service account and is decoupled from the web portal system, wherein the self-service user is a customer of the self-service account;

creating a self-service user identity and corresponding self-service password for the web portal system that allows the self-service user to log into to the web portal system, the self-service user identity associated with self-service login information about the self-service user, wherein the self-service login information is stored by the web portal system;

creating a second user identity and corresponding second password for the web portal system that allows a second user to log into to the web portal system, the second user identity associated with second login information about the second user, wherein the second login information is stored by the web portal system and the second user is a different user than the self-service user;

after the self-service user logs into the web portal system using the self-service user identity, and in a response to a request from the self-service user at the web portal system to start the enrollment, sending an instruction to start the enrollment from the web portal system to the account management system;

in response to the instruction to start the enrollment, providing validation questions from the account management system to the web portal system, wherein the validation questions are stored within the account management system and are related to the self-service account;

receiving answers to the validation questions from the self-service user at the web portal system and sending the validation questions to the account management system;

at the account management system, validating the answers to the validation questions and sending an account identity that identifies the self-service account to the web portal system;

at the web portal system, linking the self-service user identity of the self-service user to the account identity, wherein the self-service user gains access to the self-service account within the web portal system based on the link between the account identity and the self-service user identity; and linking the second user identity of the second user to both the self-service user identity of the self-service user and the account identity within the web portal system, wherein the second user is automatically granted access to the self-service account based on the validation of the self-service user identity of the self-service user and based on the link between the account identity and the self-service user identity of the self-service user, the second user identity used by the second user to log into the web portal system.

2. The non-transitory computer-readable medium of claim 1, the enrolling further comprising removing the access to the self-service account from the second user by unlinking the second user identity from both the self-service user identity of the self-service user and the account identity within the web portal system.

3. The non-transitory computer-readable medium of claim 1, wherein the self-service user identity comprises an email address associated with the self-service user.

4. The non-transitory computer-readable medium of claim 3, wherein the login information associated with the self-service user identity comprises at least one of a name of the self-service user, a residence address of the self-service user, a billing address of the self-service user, or one or more roles associated with the self-service user.

5. The non-transitory computer-readable medium of claim 1,
wherein the self-service accounts are each associated with a different entity, and self-service account comprises an account type, and the validation questions are based on the account type.

6. The non-transitory computer-readable medium of claim 1, the enrolling further comprising:
displaying the validation questions at a user interface of the web portal system; and
receiving the answers to the validation questions from the self-service user via the user interface.

7. The non-transitory computer-readable medium of claim 1, wherein the request for validation, the validation questions, and the answers are sent and received over a web service.

8. The non-transitory computer-readable medium of claim 1, wherein the account identity comprises an account number of the self-service account.

9. The non-transitory computer-readable medium of claim 1, wherein the second user identity is created before the sending the instruction to start the enrollment from the web portal system to the account management system and before the self-service user gains access to the self-service account and the second user is not a customer of the self-service account.

10. A computer-implemented method for provide a self-service account enrollment to a self-service user, the computer-implemented method comprising:
providing a web portal system accessible to the self-service user that displays, on a remote device associated with the self-service user, web page information from a plurality of sources in a unified manner, wherein the web portal system provides access to a plurality of self-service accounts;
providing an account management system that is communication with the web portal system via one or more web services and is at least one of the plurality of sources displayed on the web portal system, wherein the account management system manages account information regarding the self-service account and is decoupled from the web portal system, wherein the self-service user is a customer of the self-service account;
creating a self-service user identity and corresponding self-service password for the web portal system that allows the self-service user to log into to the web portal system, the self-service user identity associated with self-service login information about the self-service user, wherein the self-service login information is stored by the web portal system;
creating a second user identity and corresponding second password for the web portal system that allows a second user to log into to the web portal system, the second user identity associated with second login information about the second user, wherein the second login information is stored by the web portal system and the second user is a different user than the self-service user;
after the self-service user logs into the web portal system using the self-service user identity, and in a response to a request from the self-service user at the web portal system to start the enrollment, sending an instruction to start the enrollment from the web portal system to the account management system;
in response to the instruction to start the enrollment, providing validation questions from the account management system to the web portal system, wherein the validation questions are stored within the account management system and are related to the self-service account;
receiving answers to the validation questions from the self-service user at the web portal system and sending the validation questions to the account management system;
at the account management system, validating the answers to the validation questions and sending an account identity that identifies the self-service account to the web portal system;
at the web portal system, linking the self-service user identity of the self-service user to the account identity, wherein the self-service user gains access to the self-service account within the web portal system based on the link between the account identity and the self-service user identity; and
linking the second user identity of the second user to both the self-service user identity of the self-service user and the account identity within the web portal system, wherein the second user is automatically granted access to the self-service account based on the validation of the self-service user identity of the self-service user and based on the link between the account identity and the self-service user identity of the self-service user, the second user identity used by the second user to log into the web portal system.

11. The computer-implemented method of claim 10, further comprising removing the access to the self-service account from the second user by unlinking the second user identity from both the self-service user identity of the self-service user and the account identity within the web portal system.

12. The computer-implemented method of claim 10, wherein the self-service user identity comprises an email address associated with the self-service user and the second user is not a customer of the self-service account.

13. The computer-implemented method of claim 10,
wherein the self-service account comprises an account type, and
wherein the validation questions are based on the account type.

14. The computer-implemented method of claim 10, wherein the login information associated with the self-service user identity comprises at least one of a name of the self-service user, a residence address of the self-service user, a billing address of the self-service user, or one or more roles associated with the self-service user.

15. The computer-implemented method of claim 10, wherein the self-service user identity comprises an email address associated with the self-service user, and the second user identity is created before the sending the instruction to start the enrollment from the web portal system to the account management system and before the self-service user gains access to the self-service account.

16. A self-service account enrollment system that provides a self-service account enrollment to a self-service user, the system comprising:
one or more processors;
a memory configured to store one or more instructions;
the processors, when executing the instructions, generating a web portal system accessible to the self-service user that displays, on a remote device associated with the self-service user, web page information from a plurality of sources in a unified manner, wherein the web portal system provides access to a plurality of self-service accounts; and
generating an account management system that is communication with the web portal system via one or more web services and is at least one of the plurality of sources displayed on the web portal system, wherein the account management system manages account information regarding the self-service account and is decoupled from the web portal system;
the processors, when executing the instructions, further:
creating a self-service user identity and corresponding self-service password for the web portal system that allows the self-service user to log into to the web portal system, the self-service user identity associated with self-service login information about the self-service user, wherein the self-service login information is stored by the web portal system, wherein the self-service user is a customer of the self-service account;
creating a second user identity and corresponding second password for the web portal system that allows a second user to log into to the web portal system, the second user identity associated with second login information about the second user, wherein the second login information is stored by the web portal system and the second user is a different user than the self-service user;
after the self-service user logs into the web portal system using the user identity, and in a response to a request from the self-service user at the web portal system to start the enrollment, sending an instruction to start the enrollment from the web portal system to the account management system;
in response to the instruction to start the enrollment, providing validation questions from the account management system to the web portal system, wherein the validation questions are stored within the account management system and are related to the self-service account;
receiving answers to the validation questions from the self-service user at the web portal system and sending the validation questions to the account management system;
at the account management system, validating the answers to the validation questions and sending an account identity that identifies the self-service account to the web portal system;
at the web portal system, linking the self-service user identity of the self-service user to the account identity, wherein the self-service user gains access to the self-service account within the web portal system based on the link between the account identity and the self-service user identity; and
linking the second user identity of the second user to both the self-service user identity of the self-service user and the account identity within the web portal system, wherein the second user is automatically granted access to the self-service account based on the validation of the self-service user identity of the self-service user and based on the link between the account identity and the self-service user identity of the self-service user, the second user identity used by the second user to log into the web portal system.

17. The self-service account enrollment system of claim 16, wherein the web portal system is further configured to remove the access to the self-service account from the second user by unlinking the second user identity from both the user identity of the self-service user and the account identity within the web portal system.

18. The self-service account enrollment system of claim 16, wherein the self-service user identity comprises an email address associated with the self-service user and the second user is not a customer of the self-service account.

19. The self-service account enrollment system of claim 16, wherein the self-service accounts are each associated with a different entity, and the self-service account comprises an account type, and
the validation questions are configured based on the account type.

20. The self-service account enrollment system of claim 16, wherein the self-service user identity comprises an email address associated with the self-service user, and the second user identity is created before the sending the instruction to start the enrollment from the web portal system to the account management system and before the self-service user gains access to the self-service account.

* * * * *